Nov. 2, 1937. J. H. SCHREIBER 2,097,897
ICE VENDING MACHINE
Filed Nov. 5, 1932 11 Sheets-Sheet 2
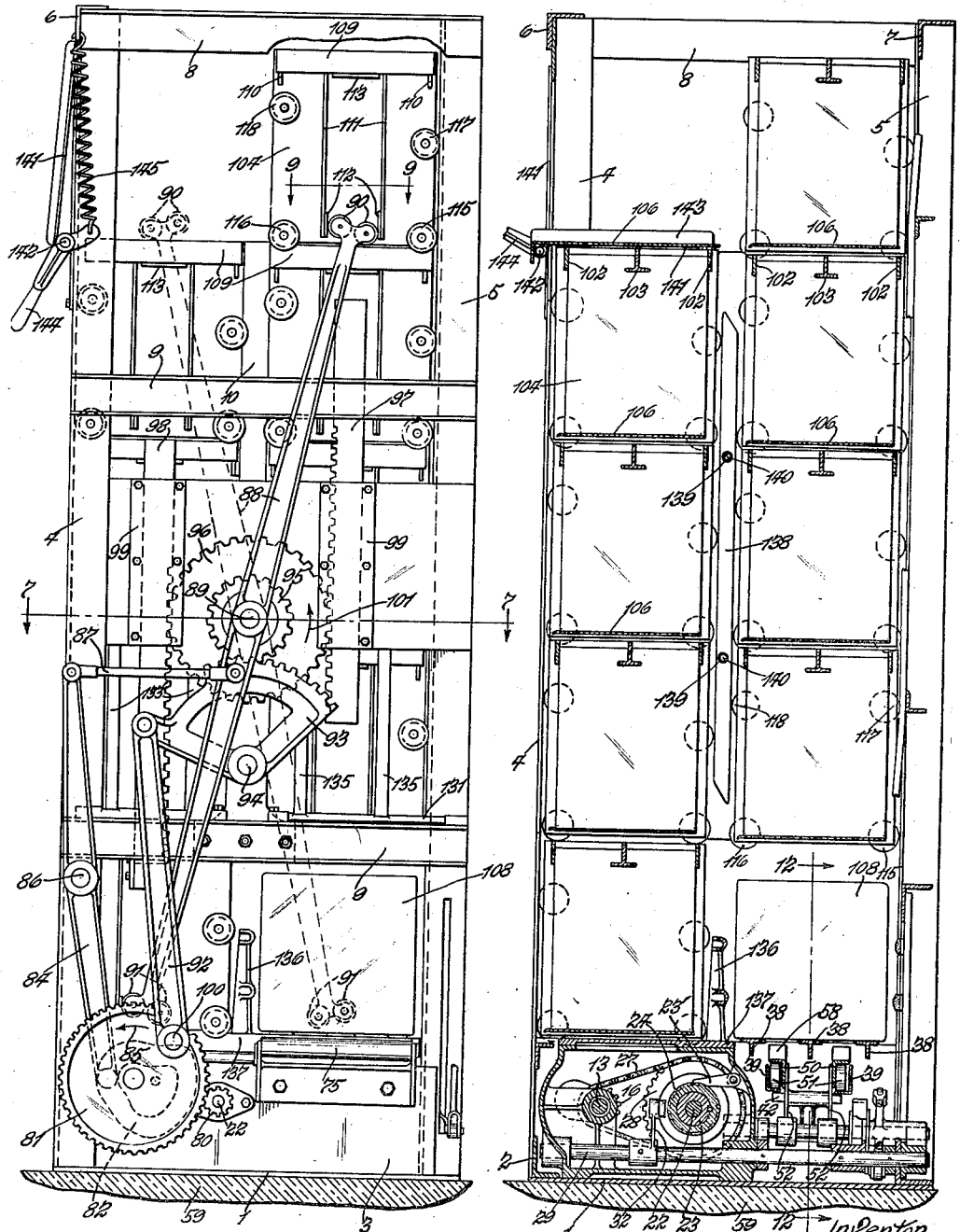

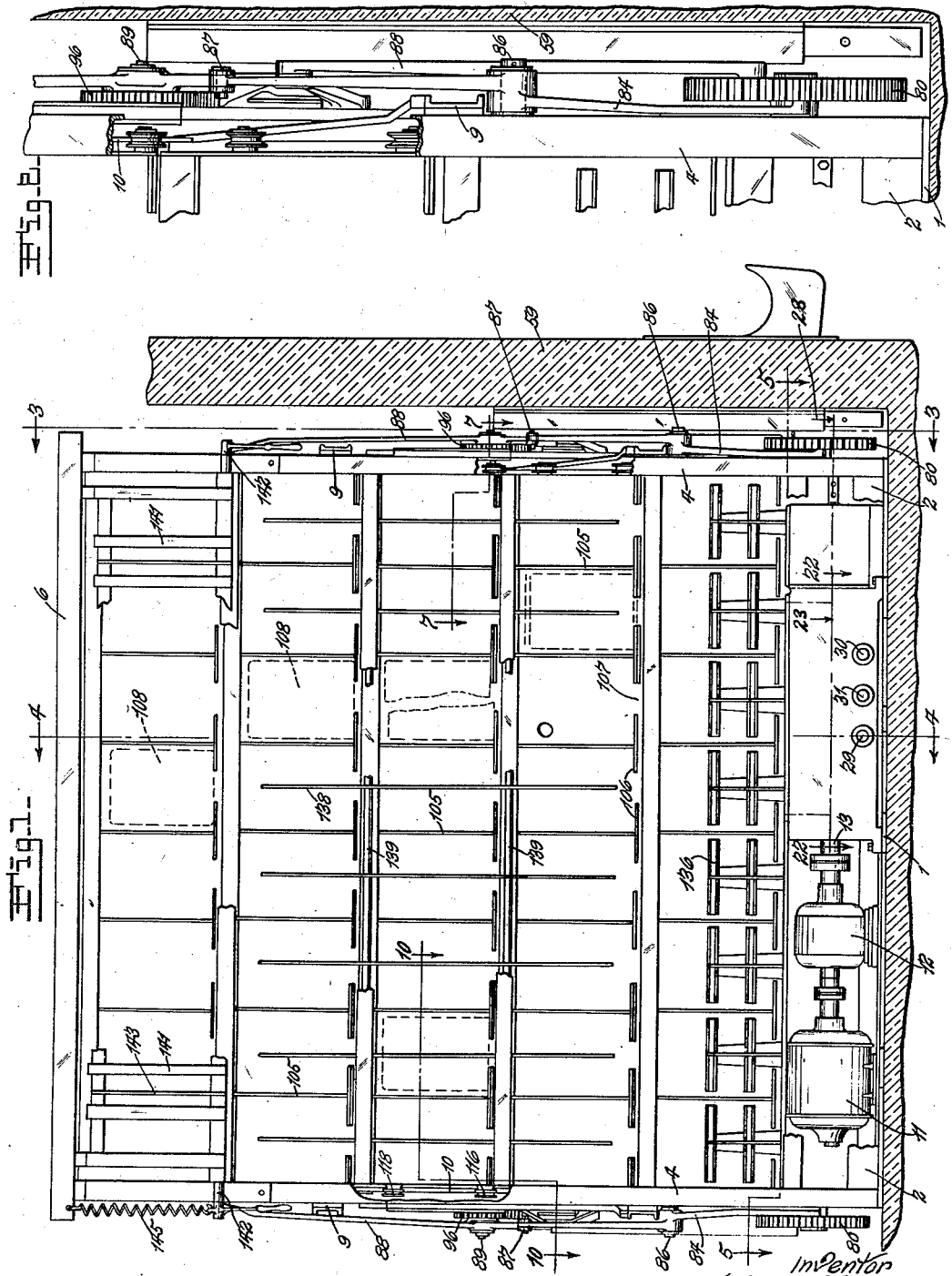

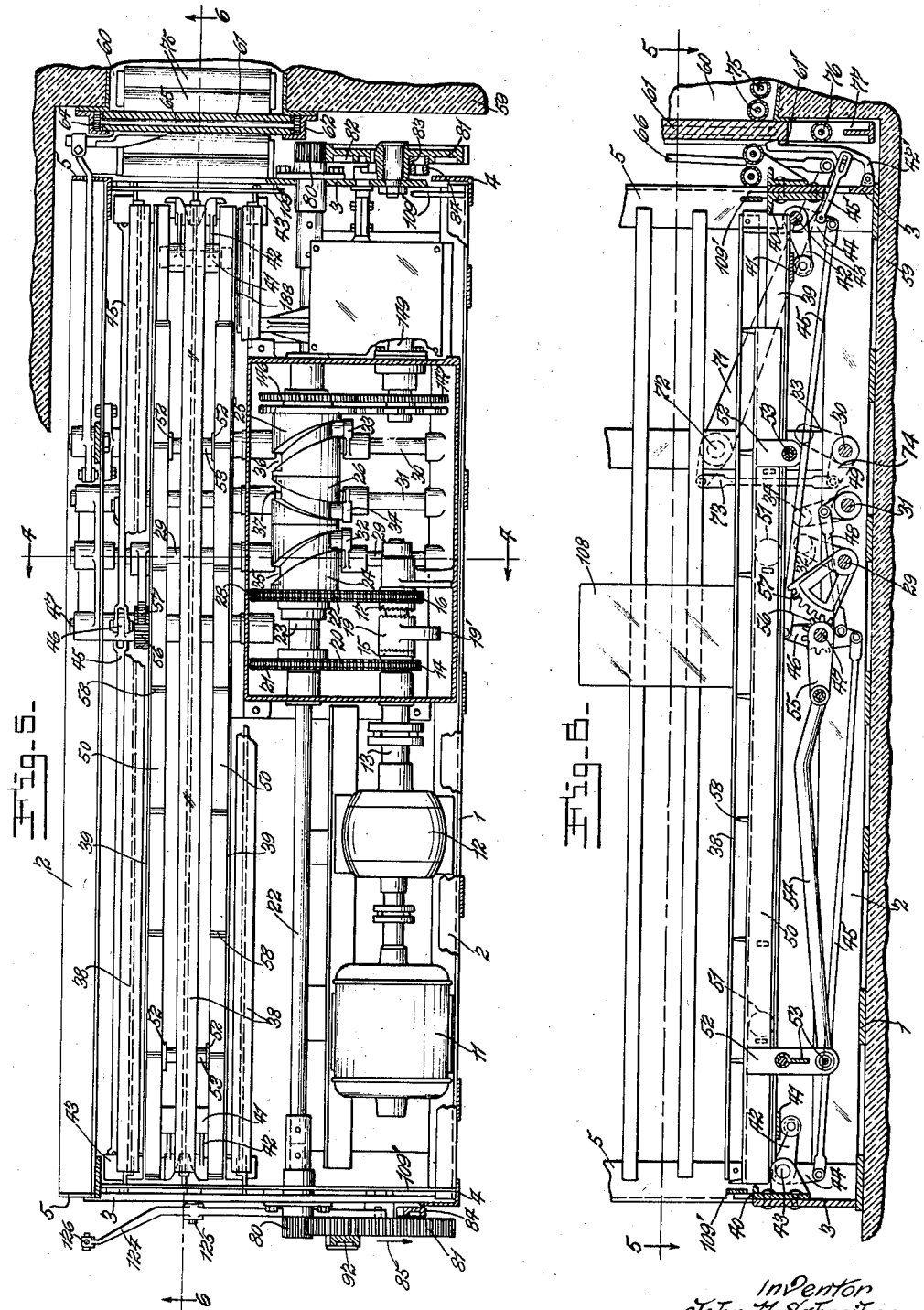

Nov. 2, 1937.  J. H. SCHREIBER  2,097,897
ICE VENDING MACHINE
Filed Nov. 5, 1932  11 Sheets-Sheet 4
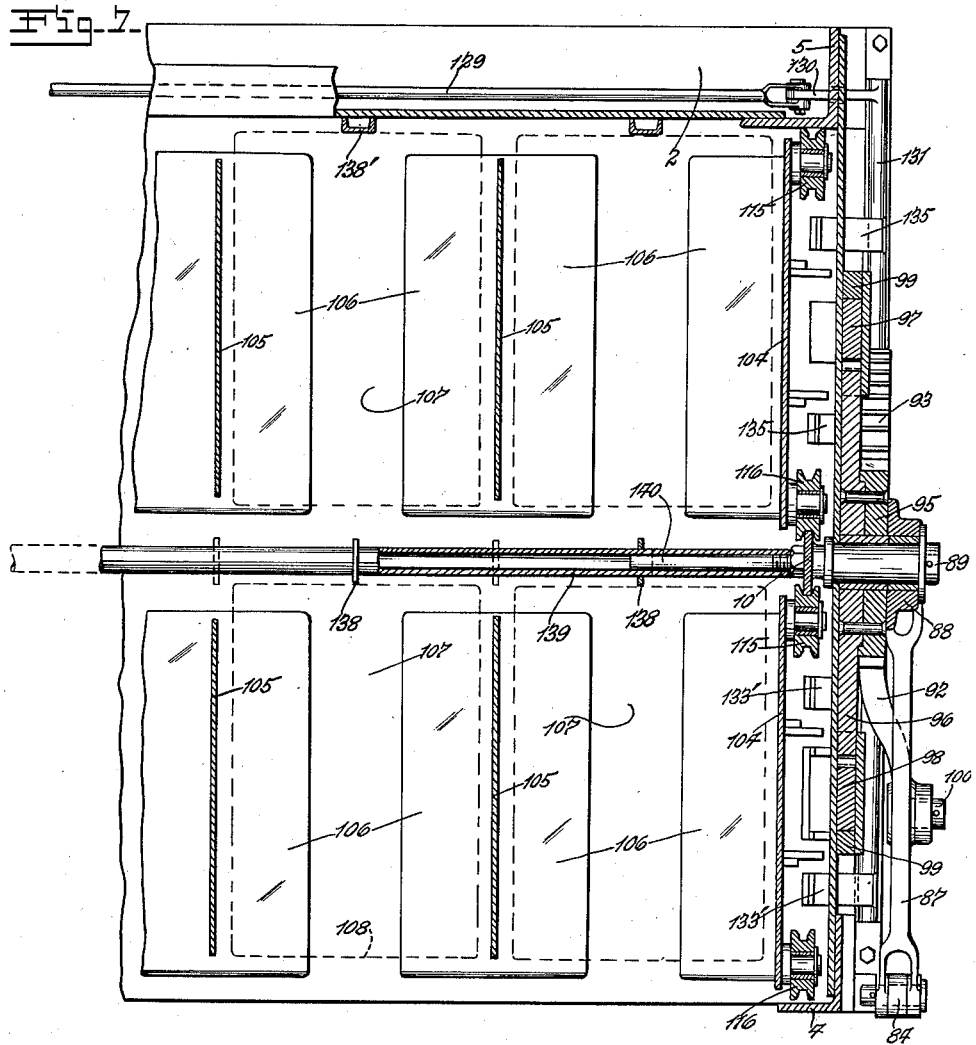
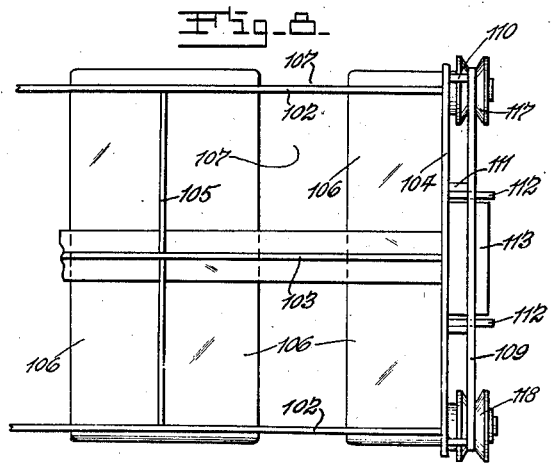
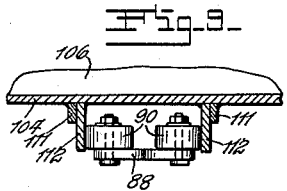

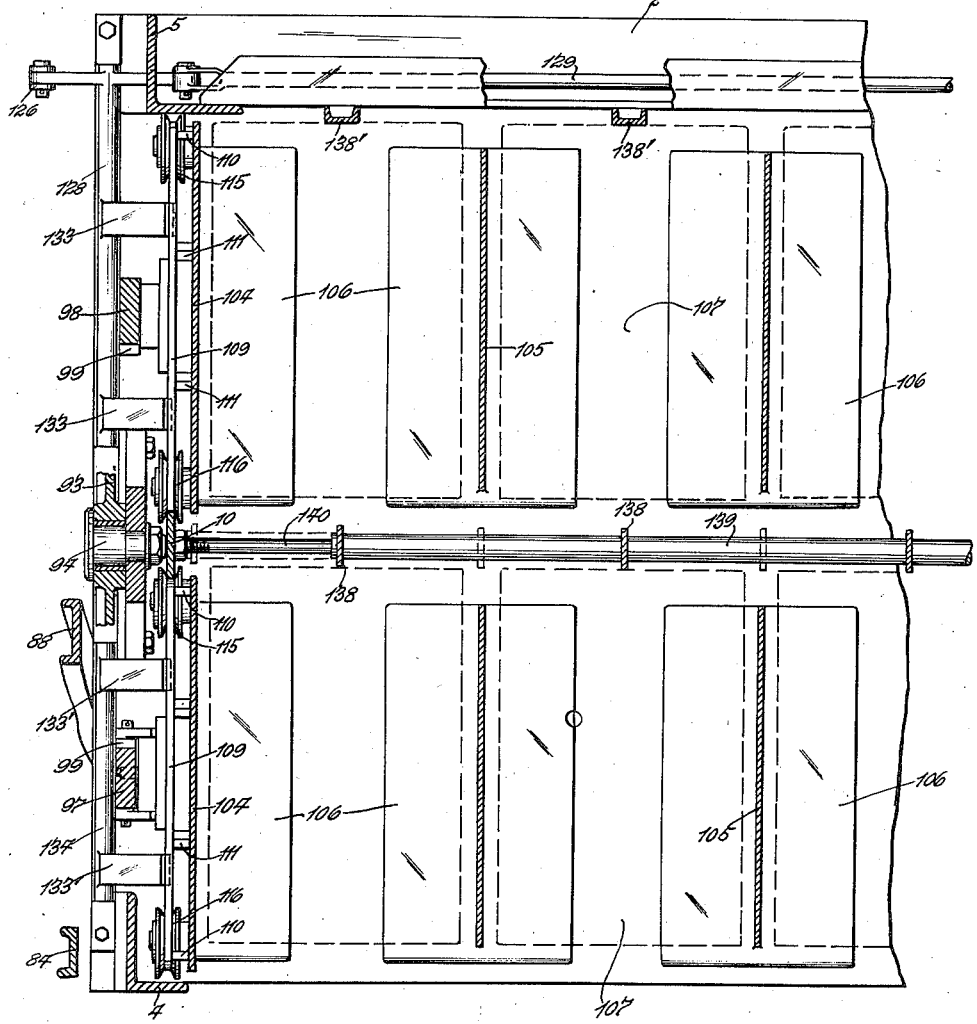

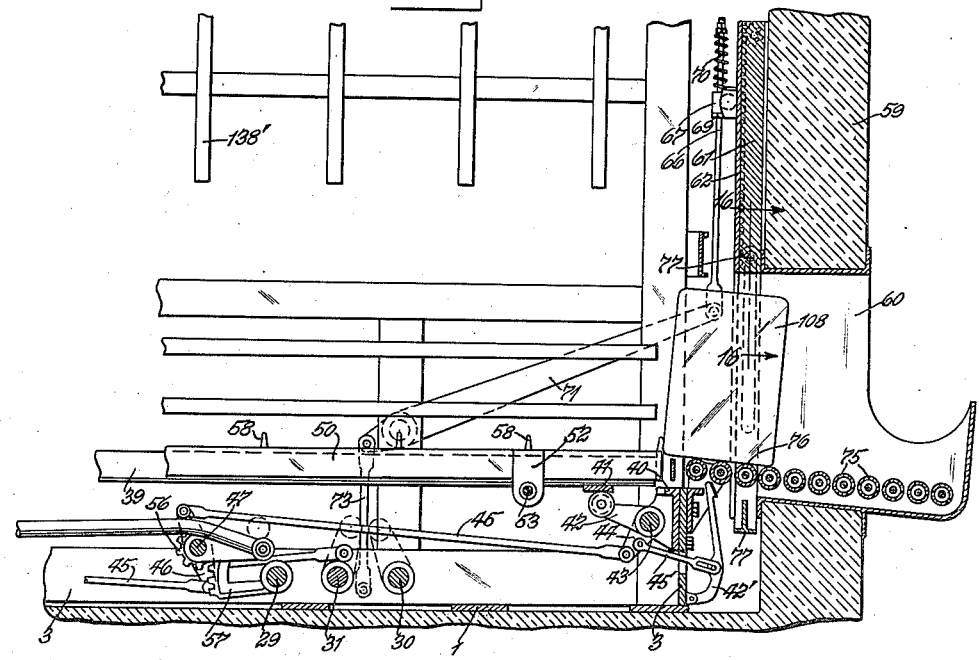
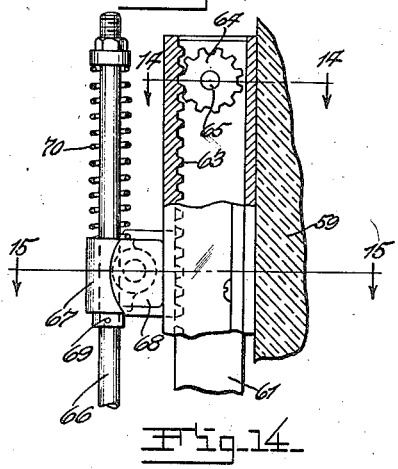
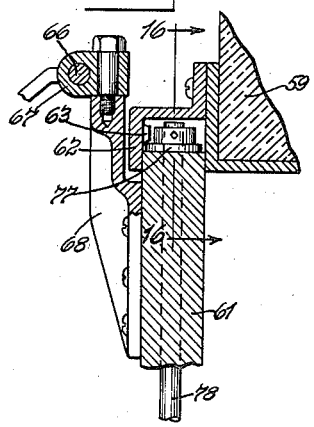
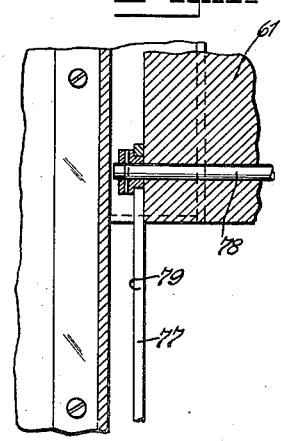

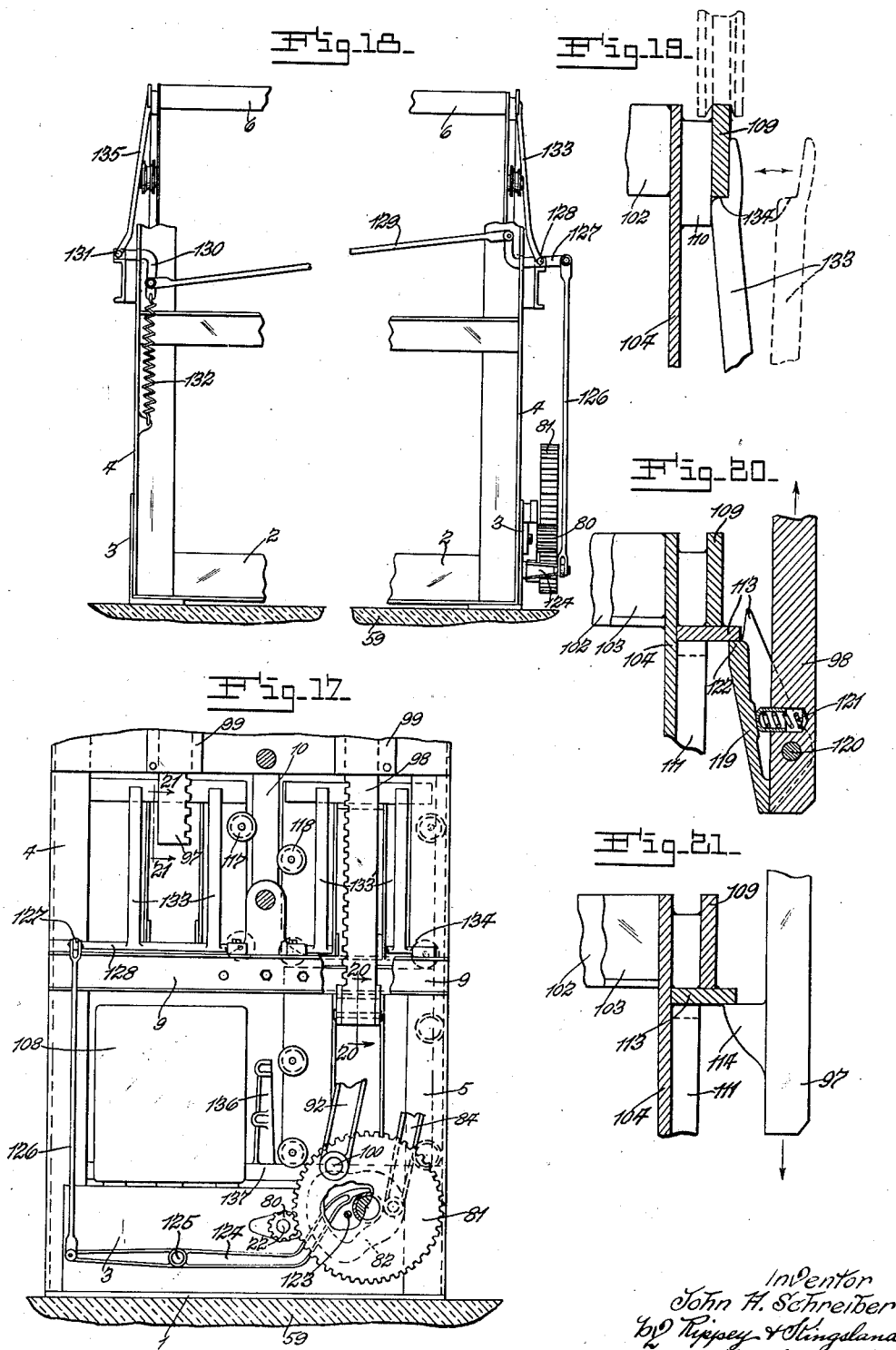

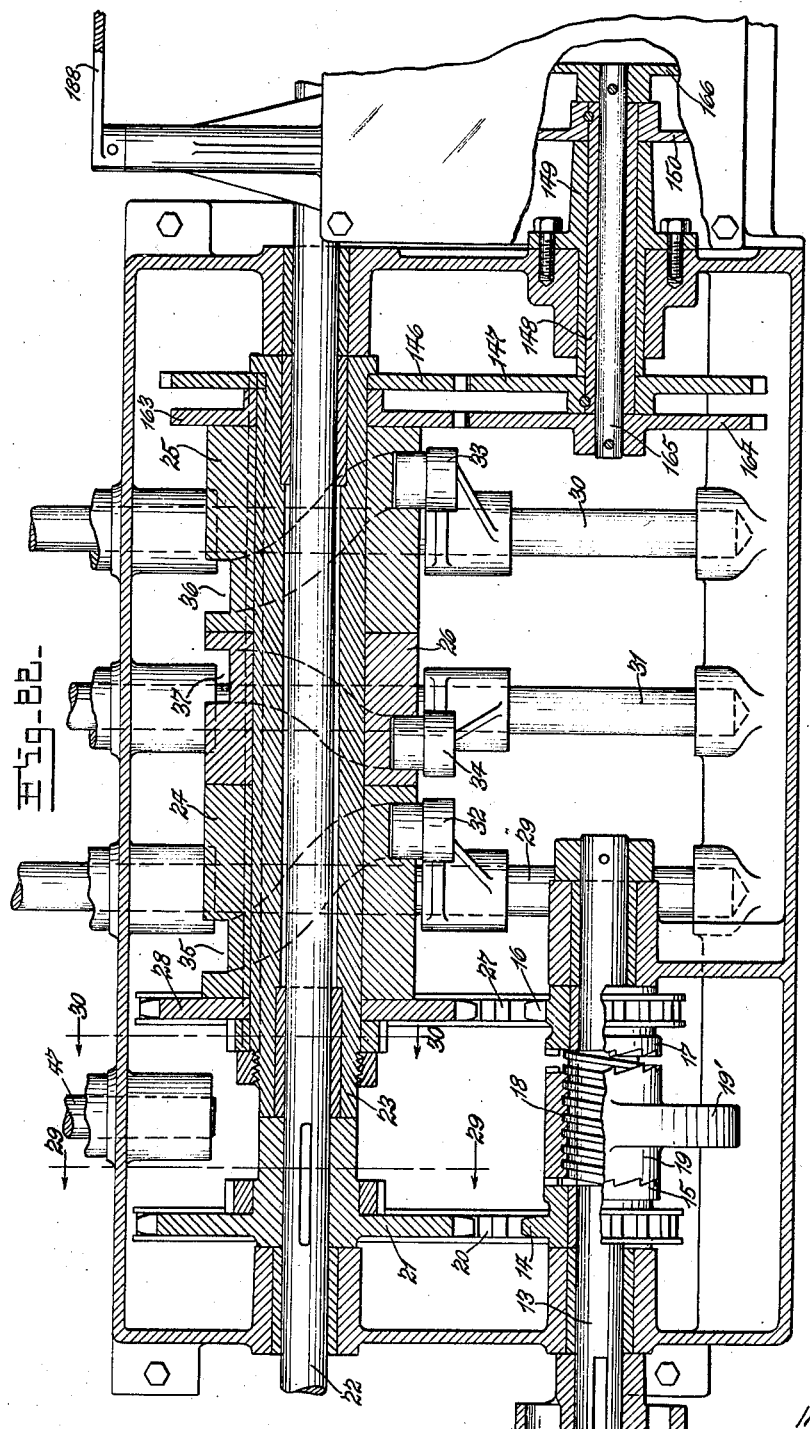

Nov. 2, 1937.  J. H. SCHREIBER  2,097,897
ICE VENDING MACHINE
Filed Nov. 5, 1932   11 Sheets-Sheet 9

Inventor
John H. Schreiber
by Rippey & Kingsland
His Attorneys.

Nov. 2, 1937.  J. H. SCHREIBER  2,097,897
ICE VENDING MACHINE
Filed Nov. 5, 1932  11 Sheets-Sheet 10
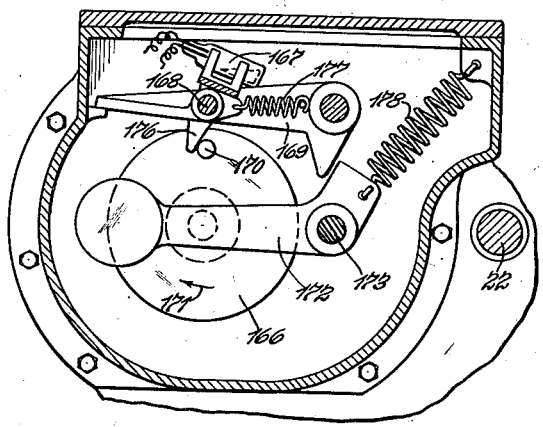
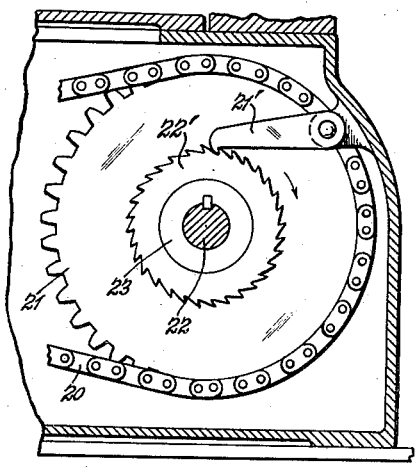
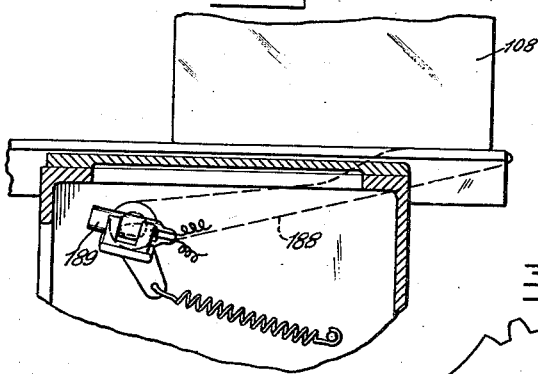
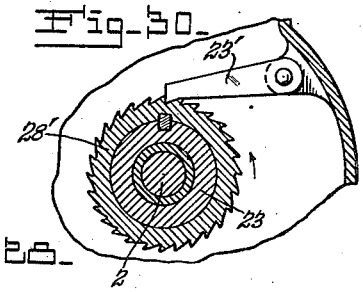
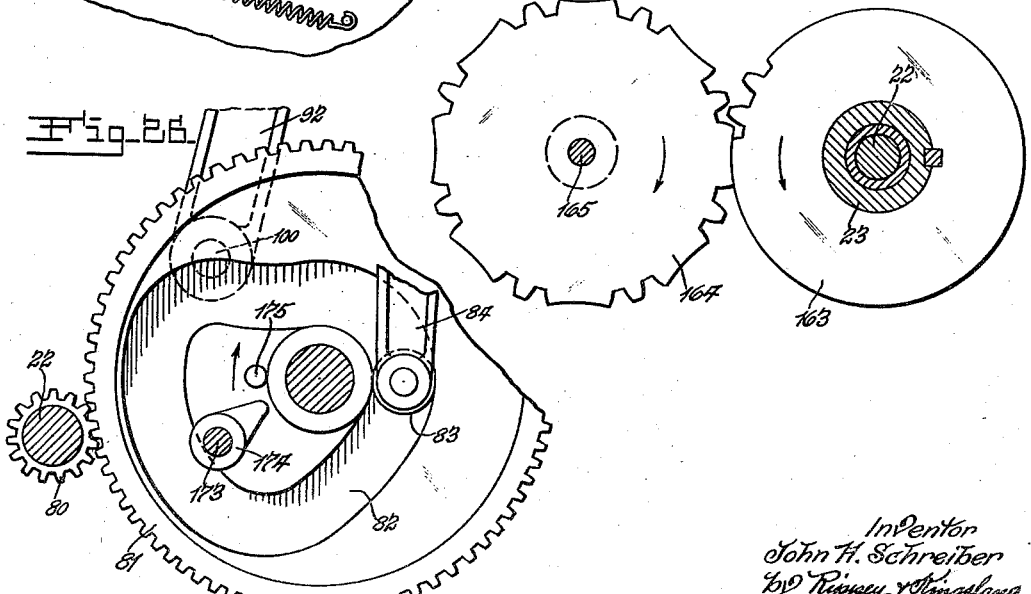
Inventor
John H. Schreiber
by Ripsey & Kingsland
His Attorneys Nov. 2, 1937.   J. H. SCHREIBER   2,097,897
ICE VENDING MACHINE
Filed Nov. 5, 1932   11 Sheets—Sheet 11
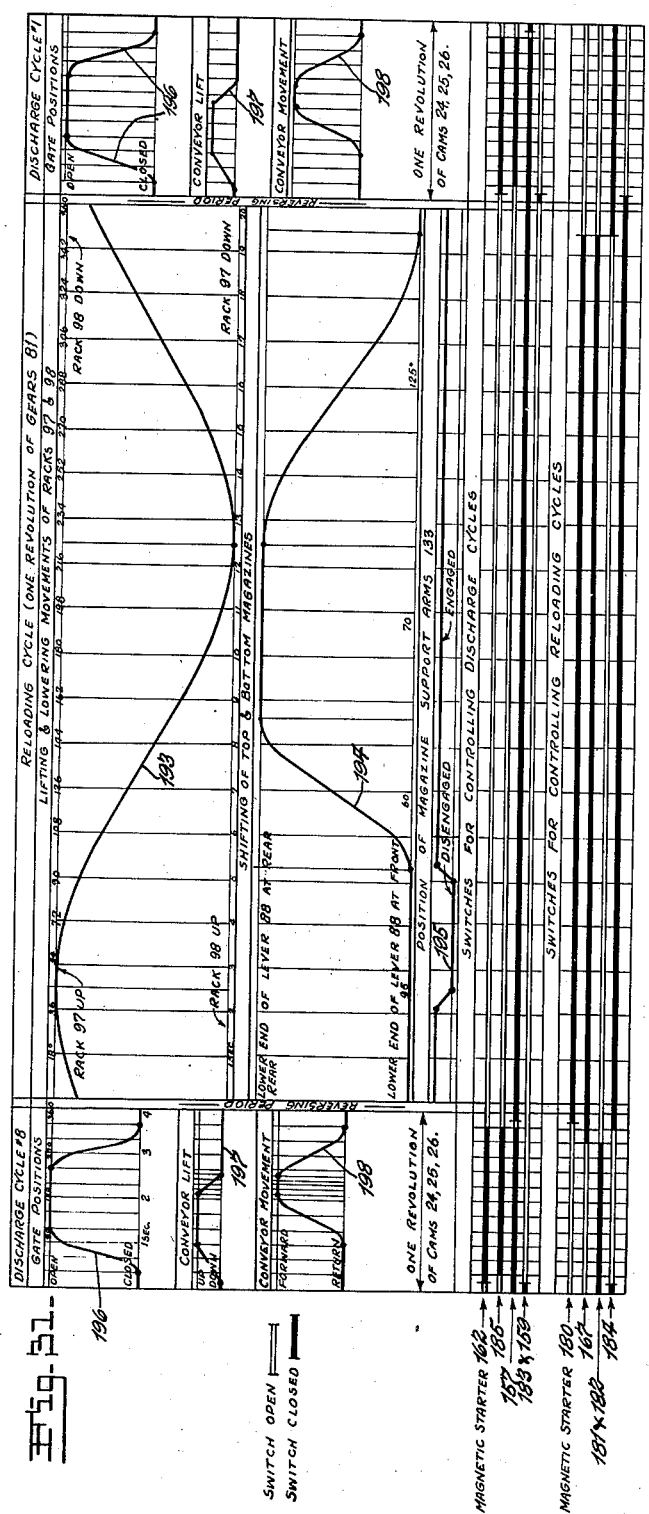
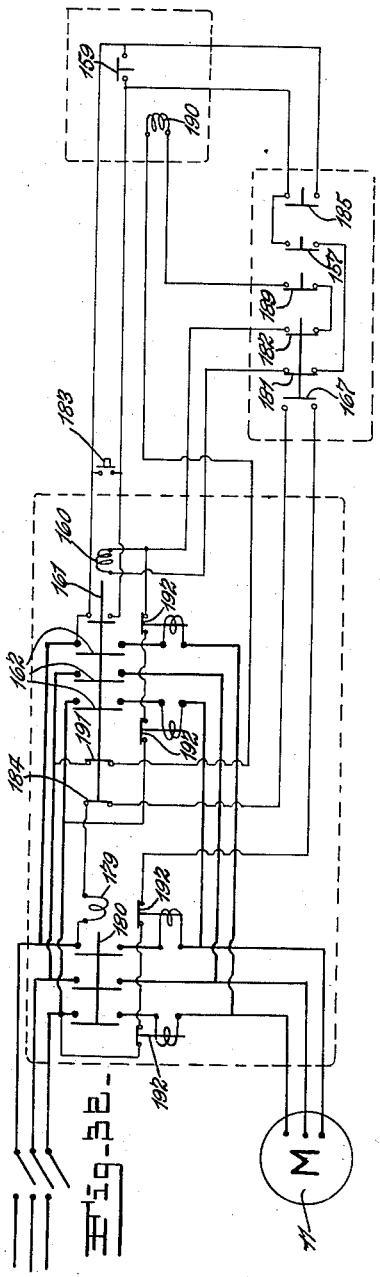
Inventor
John H. Schreiber
by Pepsey & Kingsland
His Attorneys.

Patented Nov. 2, 1937

2,097,897

UNITED STATES PATENT OFFICE 2,097,897

ICE VENDING MACHINE

John H. Schreiber, St. Louis, Mo.

Application November 5, 1932, Serial No. 641,335

21 Claims. (Cl. 312—35)

This invention relates to vending machines, and has special reference to machines designed and adapted for use as ice vending machines, although the machine may be applied to various uses.

Objects of the invention are to provide an automatic vending machine equipped with mechanism that remains normally unoperated and which operates automatically and as an incident to the insertion of a coin of the proper size and value to convey to or through an outlet opening one of the articles of merchandise contained in the machine; to provide mechanism for supporting and successively moving to proper position for ejection from the machine various separate articles to be ejected respectively by the conveyor mechanism when the machine is operated by the insertion of the coin; to provide series of magazines into which the articles are initially placed and which are operated automatically by the operating mechanism of the machine to carry the articles to the conveyor that ejects the articles successively as determined by the coins placed in the machine and controlling the operating mechanism; to provide improved means for detaching and removing the articles of merchandise from the magazine and retaining the articles in proper relationship for operation of the conveyor; to provide improved operating connections for moving the magazines through cycles of operation to positions for loading or receiving the articles, and thereafter to position to discharge the articles for subsequent operation of the conveyor; to provide an improved automatically operated closure for the outlet opening that is operated intermittently to closed and open positions by the operating mechanism placed in operation by the coins inserted in the machine; and to improve generally the entire mechanism of such a machine, so that the machine will operate accurately and precisely to place the articles of merchandise into position for discharge so long as any of the articles remain in the machine and to render the machine incapable of operation when all of the articles of merchandise have been discharged.

Various other objects and advantages of this improved machine will be readily apparent from the following detail description, without specific mention, reference being made to the annexed drawings illustrating a preferred embodiment of the invention and in which—

Fig. 1 is an elevation with parts broken away illustrating the general arrangement of the magazines and automatic operating connections.

Fig. 2 is an enlarged elevation of a part of the mechanism for raising and lowering and shifting the magazines laterally, and also illustrating a part of the guide devices for the magazines.

Fig. 3 is an end elevation of the machine at the line 3—3 of Fig. 1, illustrating the mechanism for operating the magazines vertically and laterally, and the discharge opening.

Fig. 4 is a vertical cross sectional view approximately on the line 4—4 of Figs. 1 and 5.

Fig. 5 is a horizontal cross sectional view approximately on the line 5—5 of Fig. 1.

Fig. 6 is a vertical longitudinal sectional view of the conveyor mechanism approximately on the line 6—6 of Fig. 5.

Fig. 7 is an enlarged horizontal sectional view of one end portion of the machine approximately on the line 7—7 of Fig. 3.

Fig. 8 is a plan view of one end portion of one of the magazines.

Fig. 9 is an enlarged sectional view of one end portion of a magazine engaged with a shifter device approximately on the line 9—9 of Fig. 3.

Fig. 10 is an enlarged sectional view on the irregular section line 10—10 of Fig. 1.

Fig. 11 is a diagrammatic view showing the relative positions of the tiers of magazines in the machine.

Fig. 12 is an enlarged vertical sectional view on the line 12—12 of Fig. 4, illustrating the conveyor and ejector mechanism.

Fig. 13 is a detail view of the mechanism for operating the closure for the outlet opening.

Fig. 14 is a horizontal sectional view on the line 14—14 of Fig. 13.

Fig. 15 is a sectional view on the line 15—15 of Fig. 13.

Fig. 16 is a sectional view on the line 16—16 of Figs. 12 and 15.

Fig. 17 is an end elevation of the lower part of the machine opposite from the discharge end.

Fig. 18 is a detail view showing the mechanism for supporting the descending tier of magazines.

Fig. 19 is an enlargement of a part of the devices that support the descending tier of magazines.

Fig. 20 is an enlarged sectional view on the line 20—20 of Fig. 17, showing the devices for raising the ascending tier of magazines.

Fig. 21 is an enlarged sectional view on the line 21—21 of Fig. 17, showing one of the devices for supporting the descending tier of magazines during their descent.

Fig. 22 is an enlarged horizontal sectional view of the operating mechanism approximately on the line 22—22 of Fig. 1.

Fig. 25 is a sectional view on the line 25—25 of Fig. 23.

Fig. 26 is a sectional view on the line 26—26 of Fig. 23.

Fig. 27 is a sectional view on the line 27—27 of Fig. 23.

Fig. 28 is a sectional view on the line 28—28 of Fig. 23.

Fig. 29 is a sectional view on the line 29—29 of Fig. 22.

Fig. 30 is a sectional view on the line 30—30 of Fig. 22.

Fig. 31 is a diagram graphically illustrating the sequence of operations of the machine.

Fig. 32 is a diagram of the electric circuit wiring employed in this machine.

Figure 23:
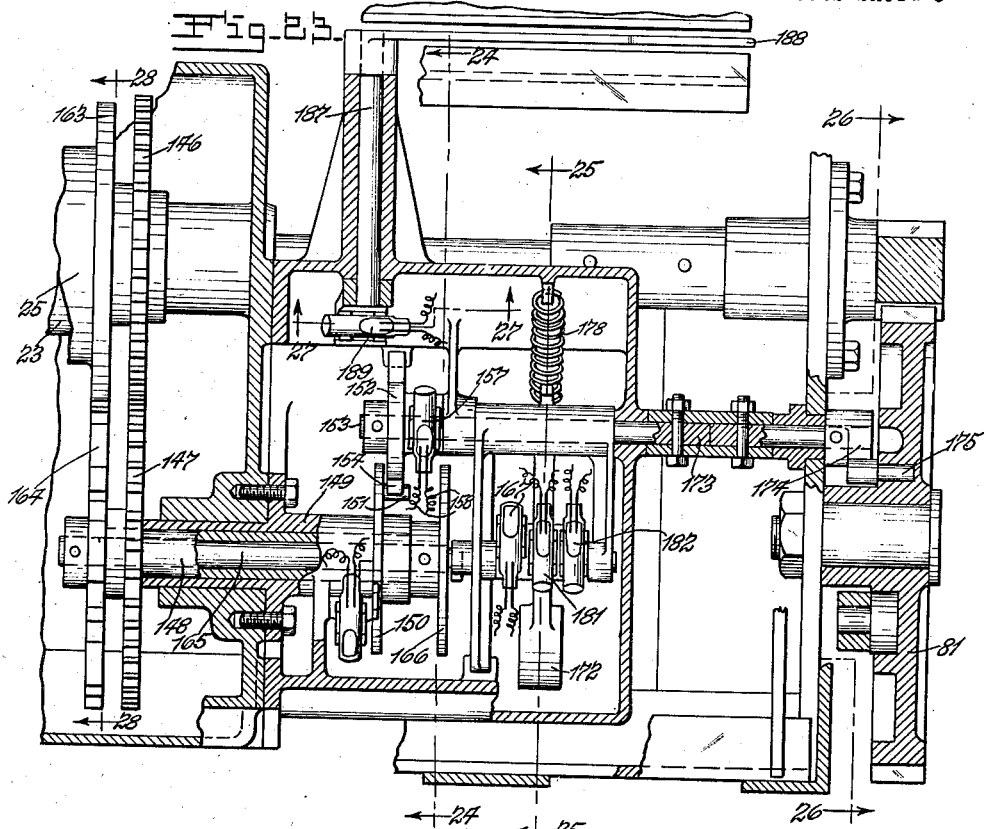
Fig. 23 is an enlarged sectional view approximately on the line 23—23 of Fig. 1.

The machine comprises a number of transverse bottom frame members 1 to which are attached the longitudinal side members 2 and the transverse end members 3. Two upright angular frame members 4 are attached to the bottom frame comprising the members 1 and 2 at the front of the machine, and two upright angular frame members 5 are attached to the bottom frame at the rear of the machine, and these four frame members are at the corners of the machine. The upper ends of the frame members 4 are rigidly connected with a longitudinal angular frame member 6 and the upper ends of the frame members 5 are rigidly connected by a longitudinal frame member 7 (Fig. 4). The upper ends of the frame members 4 are connected with the upper ends of the corresponding frame members 5 by transverse frame elements 8. The upright frame members 4 and 5 at each end of the machine are rigidly connected by a number of rigid transverse frame members 9 (Figs. 1 and 3). The frame members 9 at each end of the machine support a vertical guide rail 10.

An electric motor 11 (Figs. 1 and 5) is mounted upon the bottom of the frame and through a speed reducer 12 rotates the shaft 13. A sprocket wheel 14 (Figs. 5 and 22) is mounted loosely on the shaft 13 and is formed with a clutch member 15. A similar sprocket wheel 16 is also loosely mounted on the shaft 13 and is formed with a clutch member 17 extending toward the clutch member 15. The shaft 13, between the clutch members 15 and 17, is provided with threads 18 on which is screwed a clutch member 19 movable into and out of engagement with the clutch members 15 and 17, respectively, in order to rotate one or the other of the wheels 14 and 16 by the shaft 13. The motor 11 is a reverse operating motor and when rotating in one direction will operate the clutch member 19 into engagement with the clutch member 15, and when rotating in the opposite direction will disengage the clutch member 19 from the clutch member 15 and will engage said clutch member 19 with the clutch member 17, and vice versa. The clutch member 19 has a weighted portion 19′ which holds the clutch member 19 from rotating with the shaft 13 when the direction of rotation of the shaft 13 is reversed and causes said clutch member 19 to move along the shaft 13 by operation of the threads 18.

A sprocket chain 20 connects the sprocket wheel 14 with a sprocket wheel 21 attached to a shaft 22. A sleeve 23 is supported by the shaft 22 and said sleeeve supports three cams 24, 25 and 26. These cams are attached to the sleeve 23, which is not rotated by the shaft 22 but is rotative independently of said shaft. The shaft 22 may be rotated while these cams remain stationary and the cams may be rotated while the shaft 22 remains stationary. A chain 27 connects the sprocket wheel 16 with a sprocket wheel 28 attached to the sleeve 23. Accordingly, when the clutch member 19 is engaged with the clutch member 15, the shaft 22 will be rotated and the cams 24, 25 and 26 will remain stationary; and when the clutch member 19 is engaged with the clutch member 17, the cams will be rotated while the shaft 22 remains stationary.

The shaft 22 is held from rotating with the sleeve 23 by a pawl 21′ (Fig. 29) engaging a ratchet wheel 22′ rigid with the hub of the wheel 21. These devices permit the shaft 22 to be rotated in one direction by the connections for rotating the wheel 21, but prevent reverse rotation of the shaft 22.

The sleeve 23 is held from rotating with the shaft 22 by a pawl 23′ (Fig. 30) engaging a ratchet wheel 28′ rigid with the sleeve 23. These devices permit the sleeve 23 and the cams 24, 25 and 26 to be rotated in one direction by the connections for rotating the wheel 28 to prevent reverse rotation of said sleeve and said cams.

Shafts 29, 30 and 31 (Fig. 22) are journalled transversely of the axis of the shaft 22 and have cranks 32, 33 and 34, respectively, engaging in the grooves 35, 36 and 37 in the cam members 24, 25 and 26, respectively. Accordingly, rocking movements will be imparted to the shafts 29, 30 and 31 when the cams 24, 25 and 26 are rotated.

A series of supporting bars 38 are rigidly supported in parallel spaced relationship near the bottom of the machine and adjacent to the rear side of the machine (Figs. 4 and 5). A pair of longitudinal angle bars 39 are mounted for vertical movements between and are held from longitudinal movements by abutment frame members 40 (Fig. 6). These angle bars 39 are rigidly connected by transverse members 41 supported upon crank levers 42. The crank levers 42 are attached to rock shafts 43 having rigid therewith depending arms 44. Links 45 connect the arms 44 with the upper and lower ends of a lever 46 pivoted on a rock shaft 47. A link 48 connects the lever 46 with an arm 49 rigid on the shaft 31 so that, when said shaft 31 is rocked by its cam 26, the said connections from said shaft 31 will operate the lever arms 42 to raise and lower the rails 39.

A conveyor and ejector device is operative along the rails 39 and comprises a pair of angular side members 50 equipped with rollers 51 operating on the rails 39. The rails 39 cooperate with guides 52 to guide the members 50 in their longitudinal movements. The members 50 are attached together by tie members 53. A link 54 has one end pivoted to one of the tie members 53 and the opposite end pivoted to an arm 55 attached to the rock shaft 47. A segmental rack 56 attached to the rock shaft 47 is engaged by a segmental rack 57 attached to the rock shaft 29. Accordingly, when the shaft 29 is rocked by its cam 24, the shaft 47 will be rocked and the connections therefrom will reciprocate the members 50. The reciprocating movements of the members 50 are timed, so that said members 50 are moved to retracted position, which is toward the left (Figs. 5 and 6), during the time that the supporting rails 39 are in their lower position and are operated to support and move the cakes of ice when in their upper position. In their raised position the members 50 are above the plane of the supports 38. Fingers 58 project upwardly from rigid connection with the members 50 and, when said members 50 are in their raised position, these fingers project between the ice cakes, and, when said members 50 are in their lower position, the fingers 58 are below the ice cakes supported on the supports 38. Accordingly, in moving backwardly toward their retracted position, toward the left as shown in Figs. 5, 6 and 12, the fingers 58 are below the cakes of ice on the supports 38. When in their retracted position, the levers 42 are operated by the rocking of the shaft 31 to raise the members 50 and project the fingers 58 above the upper surfaces of the supports 38 and between the cakes of ice on said supports.

The machine is mounted in a cabinet or other enclosure 59 having a discharge opening 60. A gate 61 is provided to open and to close the discharge outlet and operates and moves vertically in guides 62 (Fig. 5). These guides are provided with racks 63 (Figs. 13 and 14), and the racks are engaged by pinions 64 attached to a shaft 65 rotatively supported by the gate 61 and functioning to hold the gate in proper relationship to the guides and prevent the gate from becoming jammed or wedged. A rod 66 extends through a socket 67 pivoted to an arm 68 attached to the gate 61. A collar 69 on the rod 66 will raise the gate to open position when said rod is moved upwardly. A spring 70, mounted on the rod 66 above the socket 67, will permit the rod to move downwardly without applying too great a force to the gate. This is a safety provision preventing injury to an arm or hand extending under the gate when the gate is moved toward closed position and preventing damage to the gate if a solid body becomes lodged below the gate. The lower end of the rod 66 is pivoted to one end of a lever 71 mounted on a pivot 72. A link 73 has its upper end pivoted to the opposite end of the lever 71 and its lower end pivoted to an arm 74 rigid on the shaft 30. Accordingly, when the shaft 30 is rocked by its cam 25, the gate 61 will be raised and lowered by the connections operated by said shaft 30.

A discharge device through the gate opening 60 comprises an inclined series of rollers 75. The series of rollers 75 are spaced to provide a gap into which the gate 61 extends when said gate is closed (Fig. 6). A roller 76, similar to the rollers 75, is supported by a frame 77. The gate 61 extends between the side members of the frame 77 and is connected therewith by a rod 78 (Fig. 16) extending into slots 79 in the side members of the frame 77. By this connection, the roller 76 is raised into the gap and in proper alinement with the series of rollers 75 when the gate is moved toward open position. When the gate moves downwardly to closed position, the frame 77 is moved downwardly by the rod 78 and permits the gate to move into the gap in the series of rollers 75 (Fig. 6).

A latch 42' (Figs. 6 and 12) is pivotally supported on the frame member 3 and engages the lower shoulder 61' of a depression in the gate 61 when said gate is in closed position. By this means the gate is held securely locked to prevent unscrupulous persons from forcing it open and removing articles from the machine. When the vender is operated, the latch 42' is disengaged from the shoulder 61' by means of a link 45' connected to the conveyor lifting arm 44. Since the gate is not lowered until after the latch 42' has been returned to engaging position, the lost motion connection between the latch 42' and the link 45' will enable the latch to ride over the gate and into engagement with the shoulder 61' to prevent reopening of the gate under the machine is again operated.

The intermittently rotated shaft 22 has a pinion 80 attached to each end. The pinions 80 mesh with the gears 81, each of which has a cam 82 formed in connection with its inner side. The cams 82 receive rollers 83 supported by the lower ends of levers 84. The direction of rotation of the gears 81 is in the direction of the arrows 85 (Figs. 3 and 5). The levers 84 are mounted on pivots 86 and the upper ends of said levers 84 are connected by links 87 with levers 88, there being one of said levers 88 at each end of the machine. The levers 88 are pivoted on axle members 89. The upper end of each lever 88 supports a pair of rollers 90 and the lower end of each of said levers supports a pair of similar rollers 91. Thus, it is clear that when the gears 81 are rotated in the direction of the arrows 85, the cams 82 will oscillate the levers 88 in unison and will swing said levers from the solid line position (Fig. 3) to the dotted line position, and vice versa, with a period of dwell in each of said positions during the time that the gears 81 are moving through about 90° of a revolution.

Each of the gears 81 is also a crank, the lower end of a link 92 being pivoted eccentrically to each of said gears. The upper end of each link 92 is pivoted to a segmental rack 93 mounted for rocking movements on a support 94. Each segmental rack 93 meshes with a pinion 95. The pinions 95 are mounted for rotation on the axle members 89 and are rigid with large gears 96. A vertically sliding rack 97 meshes with one side of each gear 96, and a vertically sliding rack 98 meshes with the opposite side of each of said gears. These racks operate in guides 99. Thus, it is apparent that when the gears 81 are rotated, rocking movements are imparted to the segment 93 and thereby to the gears 96, and the racks 97 and 98 are moved vertically. The racks 97 are always moved in the opposite direction from that in which the racks 98 are moved, and vice versa. The stopping position of the gears 81 is clearly illustrated in Fig. 3, the pivot 100, connecting the links 92 with said gear 81, being about 45° below the highest position through which said pivots move. Accordingly, when the gears 81 start to rotate, the link 92 is moved upwardly a short distance, thereby turning the gear 96 a short distance in the direction of the arrow 101 (Fig. 3), thus moving the racks 97 upwardly and the racks 98 downwardly short distances before said racks are moved in the reverse direction by the descending movement of the pivots 100.

In the specific embodiment of the invention shown, the machine embodies two vertical tiers of magazine devices and each tier comprises four magazine devices. Of course, this arrangement and construction may be varied without departure from the nature and principle of the invention. Each magazine device comprises a pair of longitudinal upper side members 102 and a longitudinal intermediate member 103 (Fig. 4), opposite end walls 104 rigidly attached to said members 102 and 103, a series of vertical spaced partition plates 105 (Figs. 7 and 8) having their upper ends rigidly attached to the members 102 and 103, and transverse supporting plates 106 supported in spaced relationship by the partition plates 105 and the end plates 104. The plates 106 are separated by spaces 107. The cakes of ice are placed in the compartments between the respective partitions 105 and in the compartments between said plates 105 and the end plates 104. Any suitable number of these compartments may be provided in each magazine, the specific arrangement shown having eight compartments in each magazine device, so that each magazine device will support eight separate cakes of ice 108.

A rigid horizontal bar 109 (Figs. 3 and 8) is attached in spaced relationship to the upper portion of each end wall 104 by end spacers 110 and middle spacers 111. The spacers 111 extend downwardly beyond the bar 109 and their lower ends rigidly support a pair of spaced flanges 112. A horizontal ledge 113 is rigidly secured between the spacers 111 and to the lower edge of the bar 109 at each end of each end wall 104.

Each of the two racks 97 is formed with a shoulder 114 (Fig. 21) which projects under the ledges 113 on the lowest magazine unit of the tier of magazine units at the rear or descending side of the machine. Accordingly, the lowest magazine unit of the descending tier of magazine units, which are at the rear of the machine, will be supported by the ledges 113 seated upon the shoulders 114 of the two racks 97. When said racks 97 descend by operation of the gear wheels 96, of which there is one at each end of the machine, the descending tier of magazine units will be lowered a distance equal to the height of one magazine unit and the rollers 115 and 116 placed on transverse rails 109' (Figs. 5 and 6).

Each end wall 104 of each magazine unit supports a series of rollers 115, 116, 117 and 118 (Fig. 3). The rollers 115 and 116 are at the lower corners of the end walls 104 and rest upon the bar 109 of the next lower magazine unit, both in the ascending and descending series of said units. The rollers 117 and 118 are above the rollers 115 and 116, respectively, and in the descending series of magazine units the rollers 117 operate against the frame members 5, while the rollers 118 in the descending series of magazine units operate against the guide rails 10. In the ascending series of magazine units, the rollers 118 operate against the frame members 4 and the rollers 117 operate against the guide rails 10.

A lifting member 119 is connected to the rack 98 at each end of the machine by a pivot 120 and actuated toward the end walls 104 of the magazine units by a spring 121 (Fig. 20). These lifting members 119 have shoulders 122 designed and adapted to engage under the ledges 113 and thereby raise the tier of magazine units at the front or ascending side of the machine during upward movement of the racks 98.

The gear wheel 81, at the end of the machine opposite the discharge opening 60, supports a pin 123 (Fig. 17) which operates to engage and swing upwardly the adjacent end of a lever 124 during a part of the revolution of said wheel 81. The lever 124 is supported on a pivot 125 and the outer end of said lever is pivotally connected with the lower end of a link 126, the upper end of which link is pivoted to the outer end of an angular lever 127. The lever 127 is attached to a rocking shaft 128. The upper end of the angular lever 127 is pivoted to one end of a link 129, the other end of said lever being pivoted to one end of an angular lever 130 (Fig. 18). The opposite end of the lever 130 is attached to a rock shaft 131 at the opposite end of the machine from the rock shaft 128. A spring 132, connecting the lever 130 with the machine frame, acts to hold the lever 130 and the train of connections therefrom to the lever 124 in their unoperated positions. A pair of upstanding arms 133 are attached to the shaft 128 and extend inwardly toward the end walls 104 of the lowest magazine unit in the descending tier of magazine units. These arms 133 are formed with shoulders 134 near their upper ends which engage under the bars 109 to support the magazine units of the descending series.

A pair of arms 135, similar to the arms 133, are attached to the rock shaft 131 and are operated in a like manner to engage under the adjacent bars 109 of the lowest magazine unit in the descending series.

A pair of arms 133' (Fig. 17), similar to the arms 133, are provided at each end of the machine for supporting the magazine units in the ascending series. These arms 133' are mounted on a pivot 134' and the upper ends of said arms swing inwardly toward the ends of the next lowest magazine unit in the ascending tier and engage under the bars 109 and thereby support the ascending tier of magazine units. These arms 133' support the ascending tier of magazine units when the racks 98 descend for the purpose of engaging and raising the last magazine unit that had been shifted from the descending tier to the ascending tier by operation of the levers 88. Accordingly, it is clear that the arms 133' will support the ascending tier of magazine units high enough to permit another magazine unit to be shifted thereunder by operation of said levers 88.

The rollers 90 on the upper ends of the levers 88 are received between the flanges 112 of the uppermost magazine unit in the ascending tier during upward movement of said ascending tier of magazine units, and the lever 88 is then operated to shift laterally the uppermost magazine unit from the ascending tier to the descending tier, the rollers 115 and 116 operating along the bars 109 of the next lower magazine units (Figs. 3 and 9).

The rollers 91 on the lower end of the levers 88 are in position to be received between the flanges 112 on the lowest magazine unit in the descending tier during the time that the rollers 90 are in position to be received between the flanges 112 of the uppermost magazine unit in the ascending tier, as just described. The shifting of the levers 88 then moves the lowest magazine unit in the descending tier laterally to position as the lowest magazine unit in the ascending tier. The shifting of the upper magazine unit from the ascending tier to uppermost position in the descending tier and the shifting of the lowest magazine unit in the descending tier to lowest position in the ascending tier are simultaneous operations effected by the levers 88.

During the time that the pivots 100 are moving from their stationary positions, indicated in Fig. 3, upwardly to their highest positions, the racks 97 are moved upwardly and the racks 98 are moved downwardly short distances. Such upward movements of the racks 97 is enough to engage the shoulders 114 with the ledges 113. When the shoulders 114 are engaged with the ledges 113, the weight of the descending tier of magazine units is released from the arms 133.

Then during the descending movement of the pivot pins 100, the racks 97 are moved downwardly, permitting the descending tier of magazine units to move downwardly and the rollers 115 and 116 to engage upon the transverse rails 109' preparatory for lateral shifting of the lowest magazine unit from the descending tier to the ascending tier.

During this time the levers 88 have been operated to the dotted line position shown in Fig. 3, placing the rollers 90 in position to be received between the flanges 112 of the uppermost ascending magazine unit and placing the rollers 91 in position to be received between the flanges 112 of the lowest descending magazine unit.

At the same time that the racks 97 are moved downwardly, the tracks 98 are moved upwardly engaging the lifting members 119 under the ledges 113 at opposite ends of the lowest magazine unit in the ascending tier. This raises all of the magazine units in the ascending tier and engages the rollers 90 between the flanges 112 of the uppermost unit in the ascending tier of magazine units. At the same time, the rollers 91 are engaged between the flanges 112 of the lowest magazine unit in the descending tier of magazine units.

In the meantime, the pin 123 (Fig. 17) is passed beyond and out of engagement with the lever 124, permitting the arms 133 to engage under the cross bars 109 of the next lowest magazine unit in the descending tier of units.

During lateral movement of the lowest magazine unit from the descending tier to the ascending tier, the ice blocks 108 are held from lateral movement and between the pairs of fingers 58, which are in vertical alinement with the partitions 105 in the starting or unoperated positions of the members 50. A series of spaced arms 136 (Figs. 1, 3 and 4) are attached to a rigid support 137 in position so that said arms 136 extend through the spaces 107 at the bottoms of the magazine units during lateral movement of the magazine units from the descending tier to the ascending tier. These arms 136 hold the ice cakes from lateral movement so that said ice cakes are slipped from the supports 106 onto the supports 38.

Next, the members 50 are operated forwardly to move all of the ice blocks forwardly, eject the foremost ice block onto the rollers 75, and place the remaining ice blocks in proper position for another operation. This forward movement of the ice blocks places the second ice block from the front in the front position when the foremost ice block is ejected and discharged. When the ice blocks are thus moved forwardly the members 50 are lowered and carry with them the fingers 58 below the lower surfaces of the ice blocks, so that the fingers 58 can move to their retracted positions without engaging the ice blocks and, when in their retracted positions, can be raised and extended upwardly between the lower portions of the ice blocks ready for another operation.

A number of vertical stops 138 are attached to tubes 139 mounted for sliding movements along rods 140. In one position of these stops 138, they are opposite the spaces 107. In another position, the stops 138 are in alinement with the partitions 105 and are between the partitions 105 in the ascending and descending series of magazine units (Fig. 7).

Upright bars 138' are attached to the frame structure of the machine in position to be engaged by and stop the cakes of ice when the cakes of ice are slipped into the magazine compartments in the descending series of magazines. In addition to preventing the cakes of ice from moving through and beyond the magazine during loading, these bars 138' also function as guides for the outer ends of the cakes of ice in the descending series of magazines during downward movement.

When the machine is to be loaded or supplied with ice cakes, the stops 138 are shifted laterally to position in alinement with the partitions 105, as indicated by dotted lines (Fig. 7). This permits ice blocks to be slipped across from the rear of the machine to load the tier of magazine units in the descending series. After all of the magazine units, other than the uppermost unit in the descending series of the magazine units, have been loaded, the stops 138 are shifted to position opposite the spaces 107 in order to stop ice cakes passed into the ascending series of magazine units.

In order to guide ice cakes into the uppermost magazine unit in the descending series, a frame 141 is mounted on pivots 142 in connection with the frame members 4 and may be swung from upright position (Fig. 3) to horizontal position (Fig. 4) to guide ice cakes to the compartments in the upper magazine unit in the descending series. Guide flanges 143, spaced in alinement with the partitions 105, are attached to the upper side of the plate 141 so as to guide the ice cakes properly. A lever 144, for operating the plate 141, is attached to one of the pivots 142 and is connected with a spring 145 which operates to support the plate 141 yieldingly in its upper position.

Figure 24:
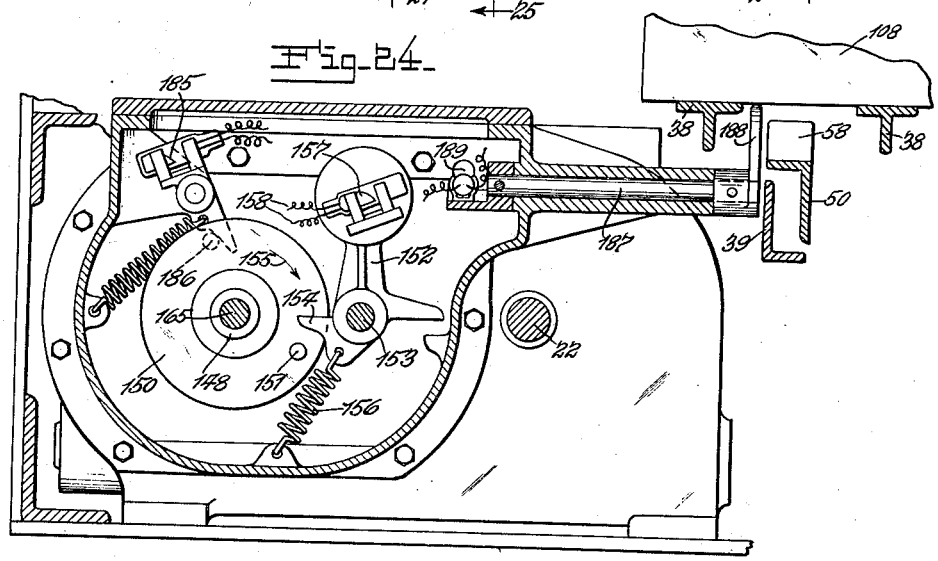
Fig. 24 is a vertical sectional view approximately on the line 24—24 of Fig. 23.

A gear 146 attached to the sleeve 23 meshes with a similar gear 147 attached to a sleeve 148 rotative in a bearing 149 (Figs. 22 and 23). A disc 150 is also attached to the sleeve 148 and has projecting from one side a pin 151. It is now clear that the gear 147 and thereby the disc 150 rotate uniformly with the sleeve 23 and with the cams 24, 25 and 26 attached to said sleeve. An arm 152 is mounted on a pivot 153 and has an extension 154 adapted to be engaged by the pin 151 once during each revolution of the disc 150 in the direction of the arrow 155 (Fig. 24). A spring 156 holds the arm 152 yieldingly in its unoperated position, as shown. A mercury switch 157, of familiar construction and operation, is mounted on the arm 152 in position to close the circuit between the electric circuit wires 158 when the arm 152 is supported in its unoperated position. During rotation of the disc 150 in the direction of the arrow 155, the pin 151 engages the extension 154 and thereby moves the arm 152 to an inclined position until the pin 151 passes beyond and out of engagement with the projection 154. Thereupon, when the projection 154 is released from the pin 151, the spring 156 throws the arm 152 in the opposite direction, causing the mercury in the switch 157 momentarily to break the circuit between the wires 158. The switch 157 is normally closed and is only momentarily opened once during each revolution of the disc 150, as indicated.

When a coin is placed in the machine, the switch 159 is thereby closed, thus energizing the magnetic coil 160 (Fig. 32) and operating the switch closure bar 161 to move to closed position the circuit closers 162. This supplies electrical energy to operate the motor to rotate the shaft 13 and move the clutch member 19 to engagement with the clutch member 17. The motor continues to operate until the disc 150 (Fig. 24) has made one complete revolution and has opened the switch 157 to stop the motor. After the motor has been intermittently operated eight different times according to the capacity of the machine illustrated, the operation of the motor is reversed. An intermittent gear 163 is attached to the sleeve 23 to operate an intermittently driven gear 164 attached to a shaft 165 supported in the sleeve 148. The intermittent gear 164 is rotated one step, which is one-eighth of a revolution, during each complete revolution of the intermittent gear 163. After eight revolutions of the gear 163, the gear 164 has made one complete revolution and a disc 166, attached to the shaft 165, has also made one complete revolution. A switch device 167 is mounted on a pivot 168 mounted on a pivoted arm 169 (Fig. 25) and is operated by a pin 170 projecting from the disc 166 during the final or eighth step by step rotary movement of said disc 166, which accompanies the intermittent gear 164 in its step by step movements. Rotation of the disc 166 in the direction of the arrow 171 causes the pin 170 to move the switch device 167 on its pivot to position to close the circuit through said switch device. A weight actuator 172 is attached to a rock shaft 173 having an arm 174 (Fig. 26) in position to be engaged by a pin 175 on the adjacent gear wheel 81 once during each revolution of said gear wheel. This operates the weight 172 and causes said weight to raise the arm 169 and disengage the extension 176 of the switch device 167 from the pin 170 and permits the spring 177 to move the switch device 167 to open position. The weight 172 is sustained in its unoperated position by a spring 178. The closing of the switch 167 closes the circuit to the magnetic coil 179 (Fig. 32), which moves the circuit closer bar 180 to close the circuit for reversing the motor 11. Reverse operation of the motor moves the clutch 19 out of engagement with the clutch member 17 and into engagement with the clutch member 15, thereby rotating the shaft 22 while the sleeve 23 and the mechanism controlled thereby remain unoperated (Fig. 22). Rotation of the shaft 22 rotates the gears 81, causing the levers 88 to be oscillated to move the magazine unit at the top of the ascending series across to the top of the descending series, and to move the magazine unit of the descending series across to the bottom of the ascending series. This also controls the rotation of the gears 96 and the operation of the racks 97 and 98 once during each eight revolutions of the intermittent gear 163, which is once during each eight revolutions of the sleeve 23 and the cams 24, 25 and 26. Closing of the switch 167 opens the switches 181 and 182 controlling the magnetic coil 160. This prevents closing of the switch 162 even if the switch 159 be closed or even if the hand starting switch 183 be closed. Similarly, the switch 184, controlled by the actuator bar 161, is open when the switches 162 are closed, thus preventing the magnetic coil 179 from operating the switch closer 180 during the time the switches 162 are closed.

During rotation of the sleeve 23, a switch 185 (Fig. 24) remains closed until a pin 186 on the disc 150 engages and operates said switch 185 to open position. However, the disc 150 rotates only a short distance until the pin 186 is moved beyond and out of engagement with the switch 185, which is immediately closed to maintain a supply of electrical energy to the magnetic coil 160, with the result that the actuator 161 is held in position to keep the switches 162 closed and the switch 184 open until this cycle of operation is complete. As the disc 150 approaches its initial starting position, the pin 186 again opens the switch 185.

A rock shaft 187 (Figs. 23 and 27) has an arm 188 engaged by the front cake of ice, which is the cake of ice closest to the outlet opening 60 and held depressed thereby. Depression of the lever 188 turns the shaft 187 to position to close an electric switch 189 in the circuit that supplies electrical energy to a magnetic coil 190 (Fig. 32) that controls effective operation of the switch 159 by an inserted coin. When the switch 189 is open, the magnetic coil 190 is deenergized and the switch 159 cannot be effectively operated. Differently expressed, the device 190 prevents acceptance of a coin by the machine when there is no cake of ice in position to be ejected. The specific details of this feature of the invention are not illustrated other than the switch 189 and its control.

A switch 191 (Fig. 32) operated by the actuator 161 performs a function similar to the function performed by the switch 189 and deenergizes the device 190 when the switches 162 are closed. Overload cut-out switches 192 are provided to open the circuits to the magnetic coils 160 and 179, and also to the device 190 in event the motor is overloaded.

In Fig. 31, the heavy lining indicates the portion of a cycle of operation of the machine during which the respective switches are closed and the parallel lines, extending from the heavy lines, indicate the periods in the cycle of operation during which the respective switches are open.

The line 193 represents the movement of the racks 97 and 98 in a cycle of operation and the line 194 represents the operation of the levers 88 in shifting the lowest magazine unit from the descending to the ascending tier and the highest magazine unit from the ascending to the descending tier. The line 195 indicates the period in the cycle of operation during which the arms 133 are operated out of engagement with the bars 139 to permit the magazine units in the descending tier to descend.

The lines 196 represent the period during which the gate 61 is moved to its open and closed positions. The irregular line 197 represents the raising and lowering of the conveyor mechanism comprising the members 59 and associated parts, and the line 198 represents the forward and return movements of said conveyor mechanism.

Accordingly, this diagram in Fig. 31 should make clear the sequence of operations of the various mechanisms and parts in order to move the magazine units through their ascending and descending operations, to remove the ice cakes from the magazine unit that is shifted from the descending to the ascending tier; the operation of the conveyor and ejector mechanism and the gate in conformity therewith to permit and effect ejection of the advanced cake of ice during the cycle of operation; the releasing of the supports 133 from the descending magazines to permit their downward movement to place ice cakes upon the supports 38 preparatory for operation of the conveyor and ejector mechanisms; and the open and closed periods of the several switches in these cycles of operation.

It should now be clear that the machine operates through these various cycles and movements automatically and as an incident to the placement of a coin of proper size and value in position to close the switch 159, until all of the ice cakes have been discharged from the machine and the machine is empty. When the machine is empty, the operating mechanism is automatically disabled by upright movement of the lever 188, which opens the switch 189 and prevents the machine from operating. As indicated, I contemplate use of an appropriate device that will prevent the insertion of a coin or will eject the coin and return it to the owner when the machine is empty, also during the time that the machine is operating, and when there is no available electric current for operating the machine. I have not specifically illustrated this device in the annexed drawings for the reason that the specific construction thereof is not claimed herein.

I am aware that the machine and the arrangement of the various mechanisms disclosed may be widely varied within the scope of a wide range of equivalents without the least departure from the nature and principle of the invention. The invention may be embodied in many forms and I contemplate such variations in the machine as may be useful in adapting the machine for various purposes to which it may well be applied. I have mentioned specifically that the machine is designed and adapted for use in vending ice cakes, but it is clear enough that the machine may be used as a vending machine for various commodities and I am not limiting myself in any of these particulars.

I claim:

1. A vending machine comprising an article serving support adapted to receive a plurality of articles to be dispensed, means other than said support operable to individually discharge said articles from said support while said support remains unoperated, mechanism for moving said means in opposite directions from and to a starting position at each effective operation thereof, and means operated in timed relation with said first named means to reload said support when discharged.

2. A vending machine comprising an article serving support adapted to receive a plurality of articles to be dispensed, means other than said support operable to individually discharge said articles from said support while said support remains unoperated, a plurality of movable storage racks each adapted to contain a reload comprising a plurality of said articles, mechanism for moving said storage racks adjacent to said serving support, and abutment members for removing reloads from said storage racks during movement of said storage racks adjacent to said serving support to replenish the supply of articles thereon.

3. A vending machine comprising an article serving support adapted to receive a plurality of articles to be dispensed, means other than said support operable to individually discharge said articles from said support while said support remains unoperated, a plurality of storage racks each adapted to contain a reload comprising a plurality of said articles, and means for sequentially moving said racks across said support and transferring the reloads therefrom to said support to replenish the supply of articles thereon.

4. A vending machine comprising an article serving support adapted to receive a plurality of articles to be dispensed, means other than said support operable to individually discharge said articles from said support while said support remains unoperated, a plurality of storage racks sequentially arranged and each adapted to contain a reload comprising a plurality of said articles, and means for moving the first of said sequence of racks across said support, transferring the reload therefrom to said support and positioning said rack at the end of said sequence.

5. A vending machine comprising a structure adapted to hold a plurality of articles to be vended, means other than said structure to sequentially deliver the articles held thereby, mechanism for moving said means in opposite directions from and to a starting position at each effective operation thereof, and means for automatically replenishing the supply of articles held by said structure when a previous supply thereof has been delivered.

6. A vending machine comprising a structure adapted to receive a plurality of articles to be vended, means other than said structure to individually deliver such articles, mechanism for moving said means in opposite directions from and to a starting position at each effective operation thereof, and means comprising a plurality of storage racks sequentially operable to resupply said structure when a previous supply has been delivered.

7. A vending machine comprising an article serving support adapted to receive a plurality of articles to be dispensed, reciprocating means other than said support operable to discharge articles from said support while said support remains unoperated, and means operated in timed relation with said reciprocating means to reload a plurality of articles onto said support when a previous supply thereof has been discharged.

8. A vending machine comprising a frame, a plurality of storage racks mounted to travel in a closed path therein and each containing a plurality of articles to be dispensed, a passage for the delivery of articles from said machine, a support, means for moving said storage racks to successively place the contents of each on said support in position to be discharged to said passage, and reciprocating means other than said support to individually discharge to said delivery passage the articles thus positioned.

9. A vending machine comprising a frame, a plurality of storage racks movably mounted therein and each adapted to contain a plurality of articles to be dispensed, a passage for the delivery of articles from said machine, a support, means comprising mechanism for moving said storage racks to successively place the contents of each on said support in position to be discharged to said passage, and reciprocating means other than said support to individually discharge to said delivery passage the articles thus positioned.

10. A vending machine comprising a frame, a plurality of storage racks mounted to travel in a closed path therein and each containing a plurality of articles to be dispensed, a support, dispensing mechanism, means to move said storage racks as aforesaid and sequentially position the contents thereof on said support for delivery by said dispensing mechanism, and means operable in timed relation with the movements of said storage racks for actuating said dispensing mechanism from and to the same starting position at each effective operation thereof to individually deliver the articles positioned for delivery thereby while said support remains unoperated.

11. A vending machine comprising a support, a reciprocating dispenser adapted to discharge articles from said support one after another to the limit of the capacity of said support and while said support remains unoperated, storage means adapted to receive a supply of articles to be vended relatively large with respect to the limit of capacity of said support, and means associated with said dispenser and storage means to periodically resupply said support with a new supply of articles from said storage means after a plurality of operations of said dispenser not exceeding the capacity of said support.

12. A vending machine comprising a frame defining a closed path, a plurality of storage racks movable in said path but of such number as to incompletely fill the same and leave a shifting space therein, a supporting structure adjacent said shifting space, means for moving said racks and sequentially shifting the same through said shifting space, means for transferring the articles carried by said racks therefrom and to said supporting structure as said racks are shifted across said shifting space and mechanism other than said supporting structure operable intermittently to discharge articles from said structure.

13. A machine for vending ice comprising a plurality of reloading racks each adapted to carry a plurality of ice blocks in mutually spaced relation in a row, a support, a server structure other than said support embodying means for moving ice blocks of a row along said support to successively deliver the same while maintaining the same in mutually spaced relation, mechanism for reciprocating said server structure from and to the same starting position at each effective operation thereof, and means for successively presenting the mutually spaced contents of said racks to said support to be delivered by said server structure while maintained in spaced relation thereby.

14. A machine for vending wrapped ice blocks comprising a plurality of storage racks each adapted to carry a plurality of wrapped blocks mutually spaced apart and thereby prevented from freezing together, supports to which said storage racks successively deliver their mutually spaced contents that they may be vended therefrom, and dispensing mechanism comprising means for raising the wrapped blocks from said supports, moving them longitudinally in raised position, and again lowering them to said supports while maintaining their mutually spaced relation to thus advance and dispense the same while eliminating freezing together of the blocks and injury to the wrappings thereof likely to occur if said wrapped blocks were intermittently slid along said supports.

15. In a machine for dispensing ice or the like, a server structure comprising supports adapted to receive a plurality of articles to be moved longitudinally thereof for delivery therefrom, a loader movable across said structure, means for transferring articles from said loader to said structure, and means for intermittently raising the articles from said supports, moving them longitudinally in raised position and then again lowering them to said supports to sequentially move the same for delivery therefrom.

16. In a vending machine, a storage structure comprising a plurality of rows of vertically superposed storage racks each adapted to receive a plurality of articles to be stored thereon, means for intermittently moving adjacent rows of racks in opposite directions and transversely shifting from row to row the racks at the ends of the respective rows toward which the said rows are moved, racks of said rows during the intervals of rest thereof being positioned in alinement and having free passage therethrough from row to row if empty, and a frame supporting said storage structure and providing free access to at least one outside row of racks, thereby to provide for loading of racks of all the rows through the racks of said outside row alined therewith.

17. In a machine for dispensing ice or the like, a server structure comprising supports adapted to receive a plurality of articles to be moved longitudinally thereof for delivery therefrom, reciprocating means for intermittently advancing articles along said supports toward the point of delivery therefrom while said supports remain unoperated, mechanism operated in timed relation with said reciprocating means to reload said server structure, and devices for advancing the articles at the point of delivery to a greater extent than other articles are advanced by said reciprocating means.

18. In a machine for dispensing ice or the like, a housing provided with a delivery opening, a server structure comprising a support adapted to receive a row of articles to be moved longitudinally of the server for delivery through said delivery opening, reciprocating means for intermittently moving said row of articles longitudinally of the server as aforesaid, devices operable beyond said first named means for advancing the articles at the point of delivery to a greater extent than other articles are advanced by said reciprocating means, storage racks for supporting articles to reload said server structure, and means for operating said storage racks in timed relation with said reciprocating means to reload said support.

19. In a vending machine, a storage rack comprising spaced end members, a frame member attached to the upper edge of each of said end members to hold the same in cantilever relation thereto and provide open spaces on the other three sides of the rack thus formed to facilitate insertion and removal of articles therefrom, and means wholly supported by said frame member for supporting articles placed in said rack and for maintaining such articles in mutually spaced relation.

20. In a vending machine having a storage rack as defined in claim 19, means to prevent accidental displacement of stored articles therefrom without hindering intentional displacement of such stored articles.

21. A storage rack for a vending machine comprising longitudinal supports in the same horizontal plane, end walls secured thereto and a series of spaced separators along said supports parallel to said end walls, said end walls and separators being positioned to one side of the plane of said supports, said end walls and separators having horizontal extensions in transverse alinement parallel to said plane forming transversely open floors for said compartments, and supporting means for said rack on the outer sides of said end walls, whereby the compartments are entirely unobstructed from side to side of said rack to permit articles to be pushed through them laterally by means passing between said extensions.

JOHN H. SCHREIBER.